US012186772B2

(12) United States Patent
Hardy et al.

(10) Patent No.: US 12,186,772 B2
(45) Date of Patent: Jan. 7, 2025

(54) PORTABLE CHEMICAL SPRAYER SYSTEM

(71) Applicant: DiversiTech Corporation, Duluth, GA (US)

(72) Inventors: Michael Hardy, Stamford, CT (US); Steve Bitondo, Stamford, CT (US)

(73) Assignee: DiversiTech Corporation, Duluth, GA (US)

( * ) Notice: Subject to any disclaimer, the term of this patent is extended or adjusted under 35 U.S.C. 154(b) by 0 days.

(21) Appl. No.: 17/892,022

(22) Filed: Aug. 19, 2022

(65) Prior Publication Data

US 2022/0388019 A1 Dec. 8, 2022

Related U.S. Application Data

(63) Continuation of application No. 17/084,813, filed on Oct. 30, 2020, now Pat. No. 11,420,221.

(51) Int. Cl.
*B05B 7/30* (2006.01)
*B05B 7/24* (2006.01)

(52) U.S. Cl.
CPC .............. *B05B 7/30* (2013.01); *B05B 7/2443* (2013.01); *B05B 7/2464* (2013.01)

(58) Field of Classification Search
CPC ........ B05B 7/30; B05B 7/2443; B05B 7/2464
USPC .......................................................... 239/307
See application file for complete search history.

(56) References Cited

U.S. PATENT DOCUMENTS 1,691,374 A 11/1928 Birkenmaier
3,106,320 A 10/1963 Campbell
4,278,132 A 7/1981 Hostetter
4,351,449 A 9/1982 Zobel
4,588,110 A 5/1986 Nelson et al.
4,967,960 A 11/1990 Futrell
5,029,758 A 7/1991 Chayer
5,100,059 A 3/1992 Englhard et al.
5,213,263 A 5/1993 Corona
5,259,557 A 11/1993 Spriggs et al.
5,421,900 A * 6/1995 Clontz .................... B08B 3/026 239/305
5,455,983 A 10/1995 Crouser et al.

(Continued)

OTHER PUBLICATIONS

Europe Search Report dated Mar. 29, 2022 in related Application 21205470.4 filed Oct. 29, 2021 (8 pages).

(Continued)

*Primary Examiner* — Chee-Chong Lee

(74) *Attorney, Agent, or Firm* — Dentons US LLP

(57) ABSTRACT

A system for combining and spraying fluids that includes a principal reservoir for holding a carrier fluid; an electric pump in communication with the principal reservoir; a power source for energizing the pump selectable between a rechargeable 12-volt battery and a 110-volt AC line; at least one auxiliary reservoir for holding an auxiliary fluid to be controllably mixed with carrier fluid being drawn from the principal reservoir; a selector valve for selecting which if any of the auxiliary fluid(s) are to be combined with the carrier fluid; a Venturi tube for combining streams of carrier fluid and selected auxiliary fluid(s) in a predetermined ratio which may be varied as desired; and a spray wand in fluid communication with the Venturi tube for discharging the selected fluids.

19 Claims, 8 Drawing Sheets

(56) References Cited

U.S. PATENT DOCUMENTS

| | | | | |
|---|---|---|---|---|
| 5,931,351 | A * | 8/1999 | Renualt | B65D 45/04 220/322 |
| 5,988,441 | A | 11/1999 | Weinaug et al. | |
| 5,996,907 | A | 12/1999 | Toetschinger et al. | |
| 6,279,836 | B1 | 8/2001 | Toetschinger et al. | |
| 6,279,838 | B1 * | 8/2001 | Sivells | A01G 25/09 239/146 |
| 6,726,065 | B2 * | 4/2004 | Sanders | G01F 11/22 222/383.2 |
| 7,207,500 | B2 * | 4/2007 | Hudson | B05B 9/0861 239/530 |
| 7,513,444 | B1 | 4/2009 | Kurminski et al. | |
| 9,259,769 | B1 | 2/2016 | Kane | |
| 9,266,152 | B1 | 2/2016 | Kane et al. | |
| 9,381,549 | B1 | 7/2016 | Kane et al. | |
| 9,933,175 | B2 | 4/2018 | Rosen | |
| 10,378,780 | B2 | 8/2019 | Kurosu | |
| 11,302,020 | B2 | 4/2022 | Matsuo et al. | |
| 2009/0314651 | A1 | 12/2009 | Field | |
| 2013/0001243 | A1 | 1/2013 | Quick | |
| 2015/0343466 | A1 | 12/2015 | Davey et al. | |

OTHER PUBLICATIONS

Canada Search Report dated Jul. 31, 2023 in related Application 3136933 filed Oct. 29, 2021 (3 pages).
Canada Search Report dated Jan. 16, 2023 in related Application 3136933 filed Oct. 29, 2021 (3 pages).
Canada Search Report dated Aug. 4, 2022 in related Application 3136933 filed Oct. 29, 2021 (4 pages).
Europe Search Report dated Feb. 29, 2024 in related Application 21205470.4 filed Oct. 29, 2021 (5 pages).

* cited by examiner

PORTABLE CHEMICAL SPRAYER SYSTEM

CROSS-REFERENCE TO RELATED PATENT APPLICATIONS

The present application is a continuation of U.S. Non-provisional application Ser. No. 17/084,813 filed 30 Oct. 2020; which is herein incorporated by reference in its entirety.

TECHNICAL FIELD

The present invention relates to systems and methods for spraying chemical mixtures; more particularly, to systems and methods for spraying chemical mixtures from a portable apparatus; and most particularly, to a portable chemical sprayer system operative at ambient atmospheric pressure wherein the sprayer apparatus is mountable on a conventional bucket defining a principal reservoir for a carrier fluid, e.g., water, and comprises at least one and preferably a plurality of auxiliary chemical reservoirs, a valve for selecting which reservoirs are to be used, a Venturi tube for siphoning and combining flow streams from the auxiliary reservoirs with the flow of carrier fluid, and an electric pump that may be powered by either an onboard rechargeable battery or a 110-volt AC outlet.

BACKGROUND OF THE INVENTION

The present invention is directed to the art of manually spraying chemicals from a portable reservoir, e.g., a 5-gallon bucket. A system in accordance with the present invention is especially useful in cleaning the coils and housing of an air handling system such as a mini-split wall-mounted air conditioning (A/C) unit.

In the prior art, U.S. Pat. No. 7,513,444 BI, issued Apr. 7, 2009, discloses an apparatus for attachment to a bucket for holding a liquid, the bucket having an upper rim.

A bail is pivotally attached to the bucket as in a conventional arrangement, the bail having an upper position and a lower position. The apparatus has a housing with a pump operatively attached thereto, the pump having an inlet in liquid communication with the bucket and an outlet for facilitating the pumping of liquid from the bucket, preferably through a spray wand with a nozzle at the outlet thereof. A member is pivotally attached to the housing at one end thereof and has a notch in another portion thereof. This member has at least a first pivotal position and a second pivotal position. When the housing is on the rim, the bail is in the upper position thereof and the member is in the first pivotal position thereof so that a portion of the bail is in the notch for thereby holding the housing to the upper rim of the bucket. The pivoting member can also hold a rechargeable battery securely in place in the first position of the member.

This apparatus thereby permits a user to purchase a liquid to be sprayed in a bucket and then attach the present invention thereto to spray the liquid contents of the bucket as desired, thereby obviating both the need to transfer the liquid to a sprayer tank and the need for an extension cord for electricity.

The disclosed apparatus lacks at least one or a plurality of auxiliary chemical reservoirs or a mixing valve for selectively spraying the contents of one or more of the reservoirs in combination with a liquid in the bucket.

Further, the disclosed apparatus is powered by an onboard 12-volt battery and is not equipped to be operated from a 110-volt AC outlet in the event the battery loses its charge during storage or use.

U.S. Patent Application Publication No. 2013/0001243, published Jan. 3, 2013, discloses a portable water station including a container or bucket with a flat bottom, a sidewall, and a top cover or lid. An electric pump resides within the bucket. A rechargeable battery is provided on the top of the lid and is electrically connected to the pump. A pipe is connected to the pump and extends through the lid and terminates in a spigot for dispensing water from the bucket when the battery switch is turned on. A valve on the pipe can be opened and closed to control water flow from the spigot. A soap dispenser is also provided on the lid.

The disclosed apparatus lacks any capability of mixing one or more chemicals in varying amounts with the contents of the bucket. Further, the disclosed apparatus is powered by an onboard 12-volt battery and is not equipped to be operated from a 110-volt AC outlet in the event the battery loses its charge during storage or use.

U.S. Pat. No. 9,266,152 BI, issued Feb. 23, 2016, discloses an apparatus for cleaning coils and fins of outdoor condenser units and the like in locations without electrical service wherein the apparatus comprises containers for water and cleaning chemical, a plumbing system for preparing and delivering a cleaning mixture, an electrical system for power, and wherein the method provides for cleaning coils by directing cleaning mixture through the coils in counter-flow to cooling air drawn through the coils by a condenser unit fan.

The disclosed apparatus is powered by an onboard 12-volt battery and is not equipped to be operated from a 110-volt AC outlet in the event the battery loses its charge during storage or use. Further, the apparatus is incapable of pumping fluid directly from a vended container such as a 5-gallon bucket.

U.S. Pat. No. 9,381,549, issued Jul. 5, 2016, discloses a system for descaling heat exchanger surfaces using an acidic solution, the system comprising a portable machine of container and cover with operating components including motor driven circulating pump, hose fittings, directional valve, fluid openings, housing and hatch mounted on reinforced cover.

The disclosed apparatus lacks a plurality of separate chemical reservoirs or a mixing valve for selectively spraying the contents of one or more of the reservoirs in combination with a liquid in the bucket. Further, the disclosed apparatus is powered solely from a 110-volt AC outlet with no provision for battery operation.

What is needed is a system for spraying fluids that includes: a) a principal reservoir for holding a carrier fluid; b) an electric pump in communication with the principal reservoir; c) a power source for energizing the pump selectable between a rechargeable 12-volt battery and a 110-volt AC line; d) at least one auxiliary reservoir for holding an auxiliary fluid to be controllably mixed with carrier fluid being drawn from the principal reservoir; e) a selector valve for selecting which if any of the auxiliary fluid(s) are to be combined with the carrier fluid; f) a Venturi tube for siphoning and combining streams of carrier fluid and selected auxiliary fluid(s) in a predetermined ratio which may be varied as desired; and g) a spray wand in fluid communication with the Venturi tube for discharging the selected fluids.

SUMMARY OF THE INVENTION

The present invention is directed to an improved system and method for mixing and spraying liquid chemicals from a portable reservoir, e.g., a 5-gallon bucket. A currently preferred embodiment comprises a principal reservoir for holding a carrier fluid; an electric pump in communication with the principal reservoir; a power source for energizing the pump selectable between a rechargeable 12-volt battery and a 110-volt AC line; at least one auxiliary reservoir for holding an auxiliary fluid to be controllably mixed with carrier fluid being drawn from the principal reservoir; a selector valve for selecting which if any of the auxiliary fluid(s) are to be combined with the carrier fluid; a Venturi tube for combining streams of carrier fluid and selected auxiliary fluid(s) in a predetermined ratio which may be varied as desired; and a spray wand in fluid communication with the Venturi tube for discharging the selected fluids.

BRIEF DESCRIPTION OF THE DRAWINGS

The present invention will now be described, by way of example, with reference to the accompanying drawings, in which.

DETAILED DESCRIPTION OF THE INVENTION

Throughout the following description, specific elements are set forth to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale.

Figure 1:
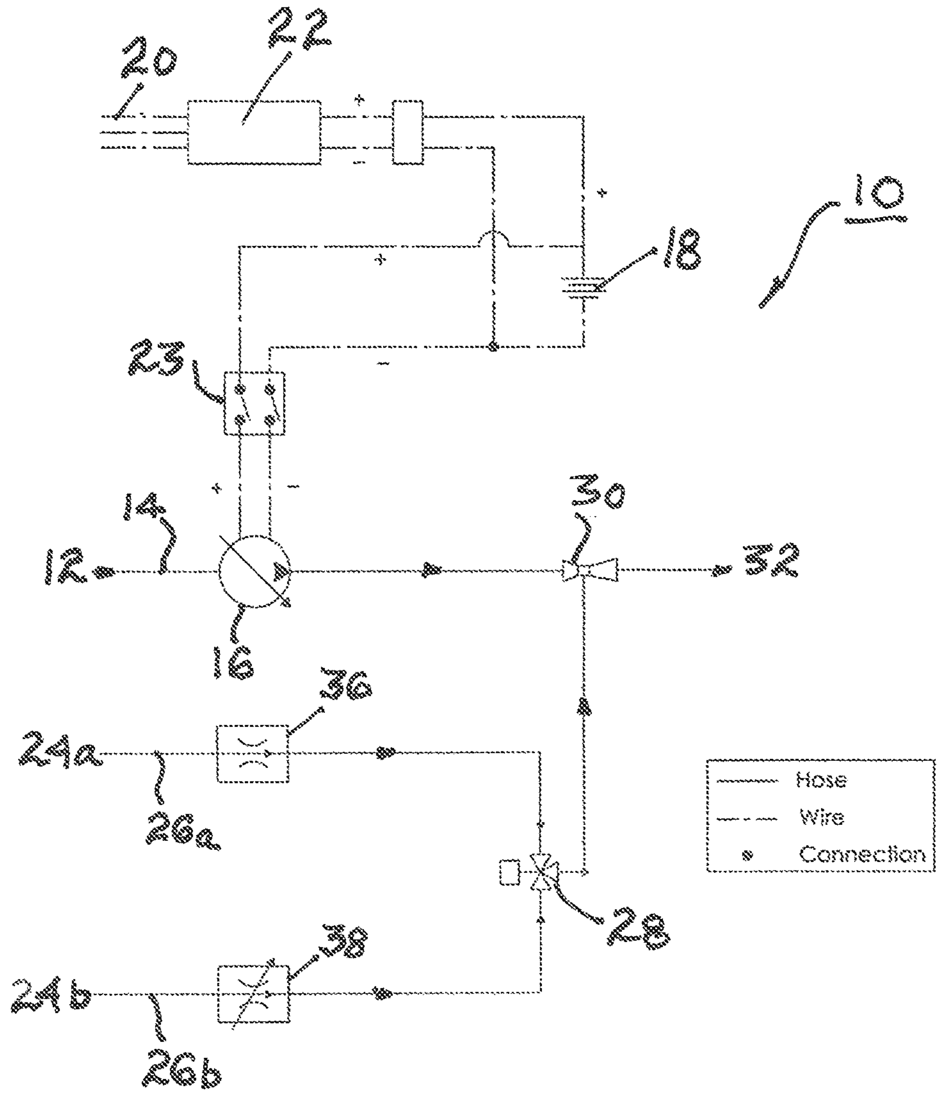
FIG. 1 is schematic diagram of a chemical sprayer system in accordance with the present invention, showing hydraulic and electrical circuitry
Figure 2:
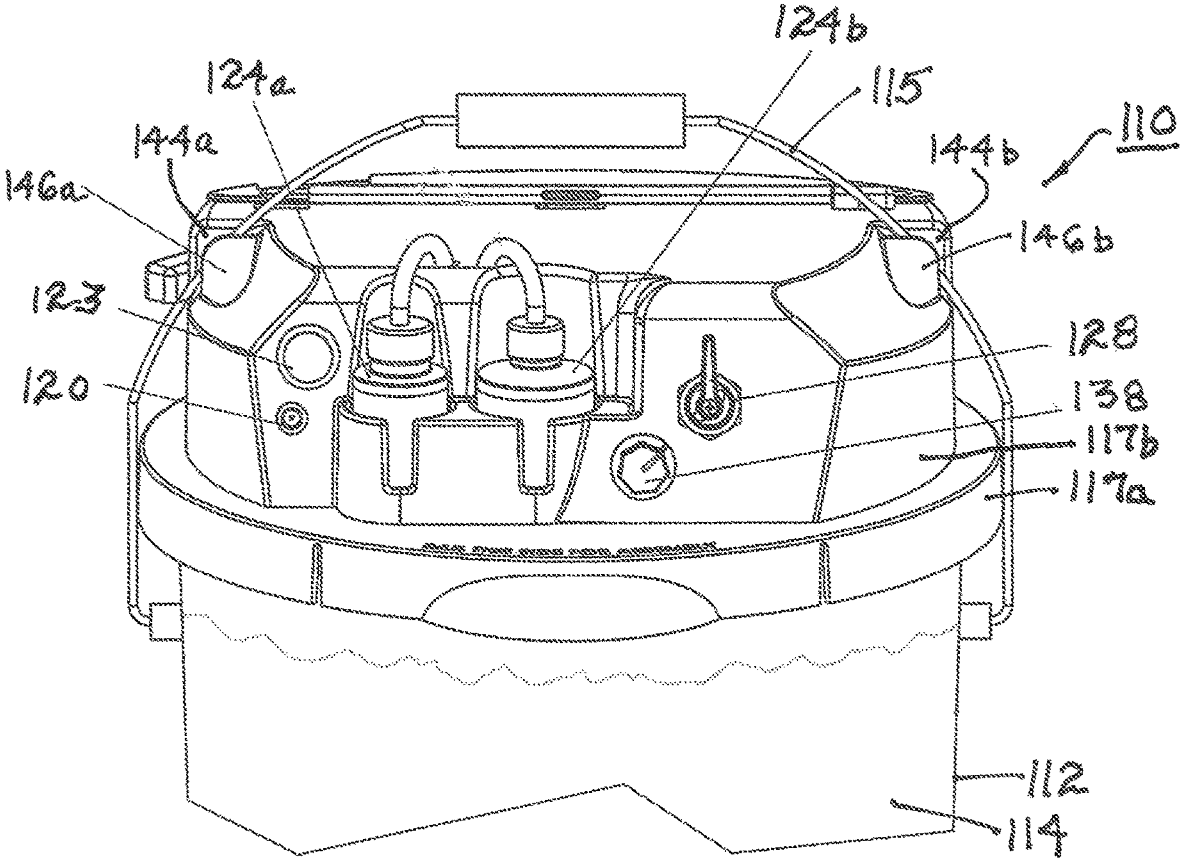
FIG. 2 is a front elevational view of a first and currently preferred embodiment of the invention.
Figure 3:
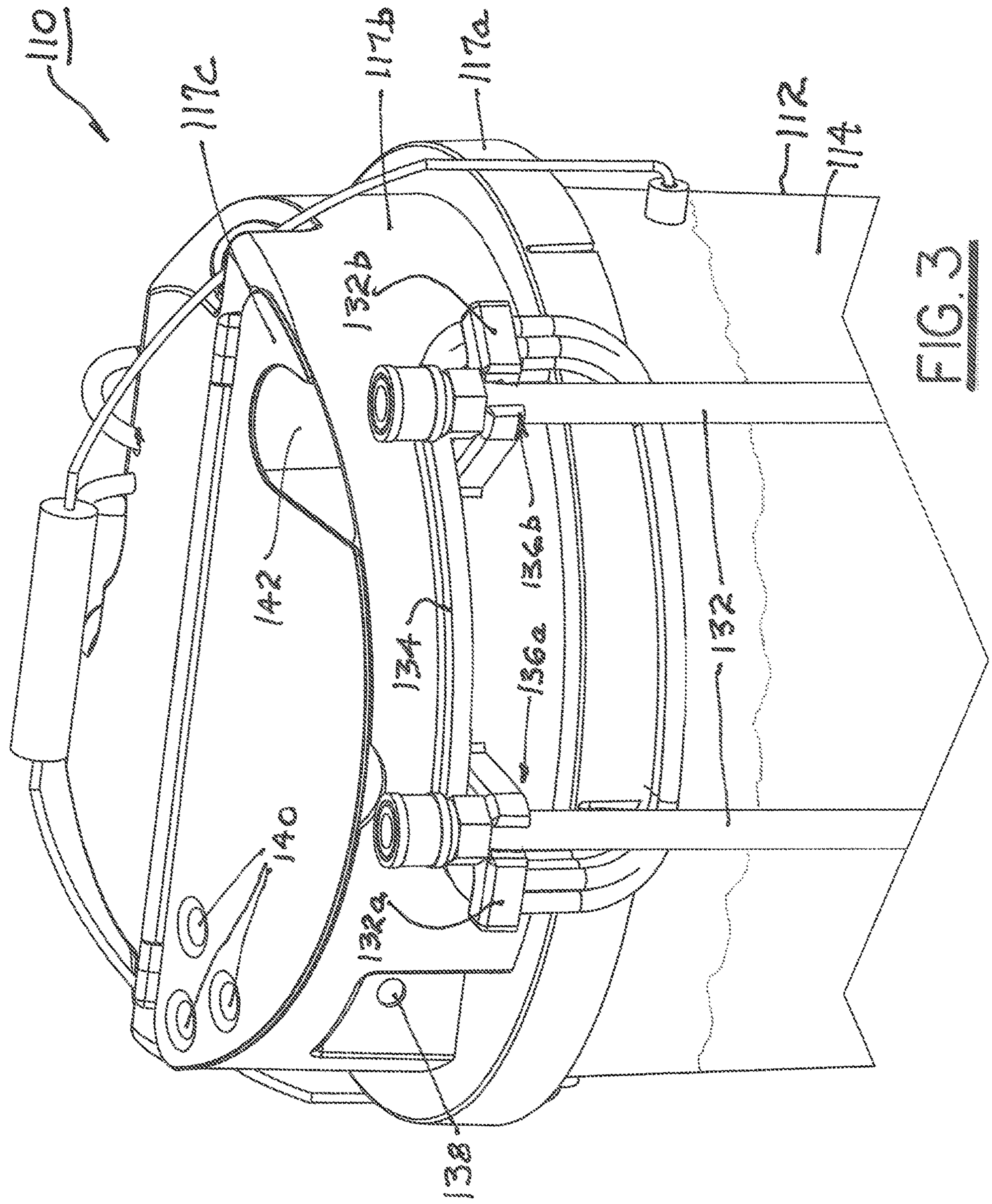
FIG. 3 is a rear elevational view of the embodiment shown in FIG. 2.
Figure 4:
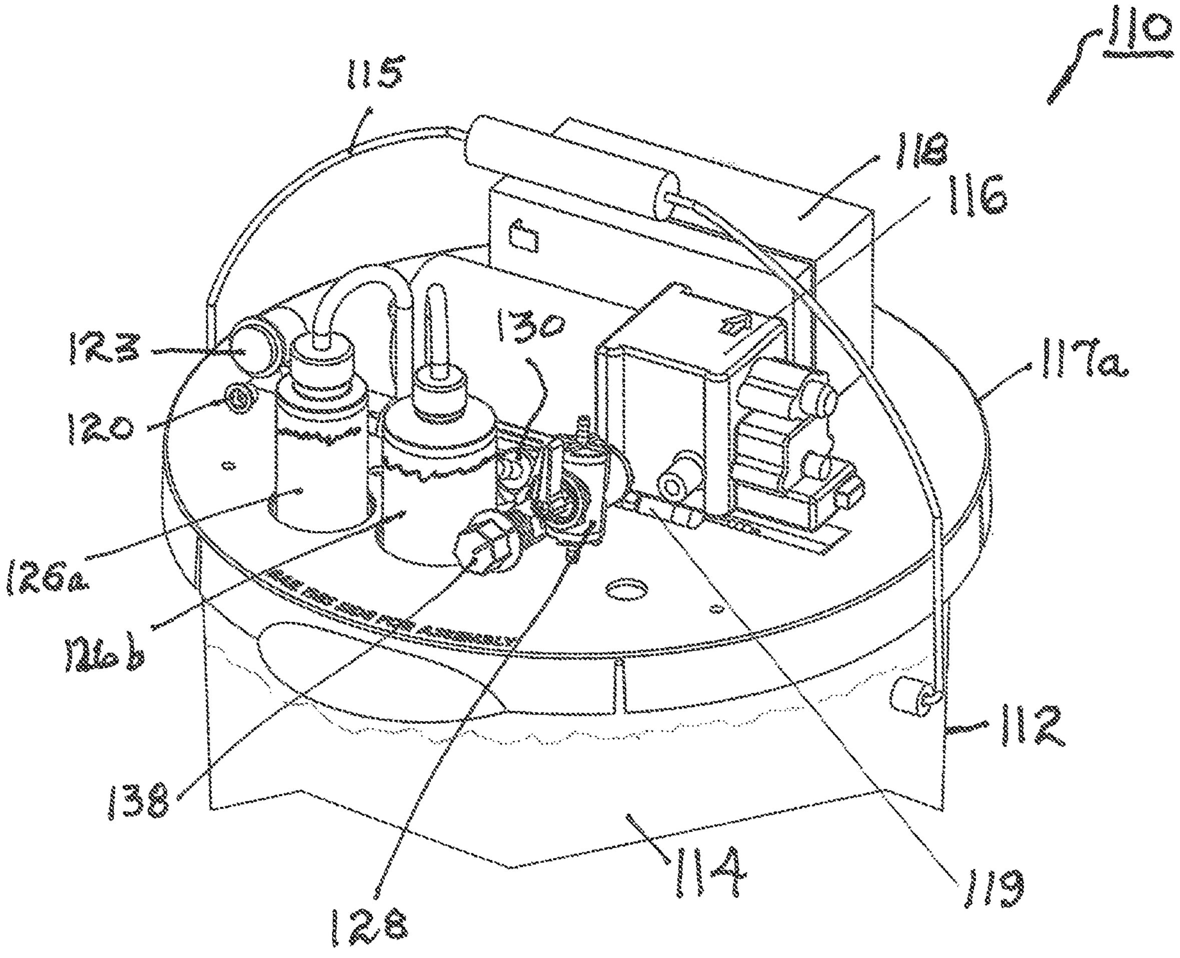
FIG. 4 is an oblique view from above of the right side with the cover removed of the embodiment shown in FIG. 2.

Referring now to FIG. 1, a schematic diagram shows a portable chemical sprayer system 10 in accordance with the present invention, and FIGS. 2 through 4 show a first and currently preferred embodiment 110 of such a portable chemical sprayer system. (Note: In the following description, item numbers from FIG. 1 are shown in FIGS. 1-4 as like numbers in the 100 series. Other numbers in the 100 series may also be used. Further embodiments employ numbers in the 200, 300, and 400 series.)

System 10 comprises: a principal reservoir 12 for holding a carrier fluid 14; a non-submersible electric pump 16 in hydraulic communication with principal reservoir 12 and carrier fluid 14; a power source for energizing pump 16 selectable between a rechargeable 12-volt battery 18 and a 110-volt AC line 20 and AC/DC transformer 22; an on/off power switch 23; at least one auxiliary reservoir 24*a*, 24*b* for holding at least one auxiliary fluid 26*a*, 26*b* to be controllably mixed with carrier fluid 14 being drawn from principal reservoir 12 by pump 16; a selector valve 28 for selecting auxiliary fluids 26*a* or 26*b* or neither or both in a combination thereof in a first predetermined ratio which may be varied as desired; a siphon apparatus 30, e.g., a Venturi tube, for siphoning and combining selected auxiliary fluids 26*a*, 26*b* with carrier fluid 14 in a second predetermined ratio; and a spray wand 32 in fluid communication with Venturi tube 30 for discharging the combination of fluids. The flow rate of auxiliary fluid 26*a* preferably is governed by a fixed orifice 36 in the flow path, although a variable orifice may be employed if desired. The flow rate of auxiliary fluid 26*b* preferably is governed by a variable orifice 38, e.g., a needle valve.

Referring now to FIGS. 2 through 5, a first and currently preferred embodiment 110 of a portable chemical sprayer system in accordance with the present invention shown in FIG. 1 comprises a principal reservoir 112 for holding a carrier fluid 114, e.g., water. A convenient and currently preferred reservoir 112 is a standard 5-gallon bucket having a molded rim 113 and a wire bail 115 although any container capable of holding a carrier fluid 114 is fully anticipated by the current invention. A supportive structure 117 holds and supports the elements of embodiment 110 as described below. Structure 117 depicted in FIG. 3 (which consists of three parts 117*a, b*, and *c*) preferably is provided in at least two parts: a lower or rim part 117*a*, molded preferably of a rigid plastic to accept and mate with rim 113, and an upper or cover part 117*b* having a hinged cover 117*c*. A non-submersible electric suction pump 116 mounted on structure 117 is in hydraulic communication with principal reservoir 112 via suction tube 119 for supplying carrier fluid 114. A power source for energizing pump 116 is selectable between a rechargeable 12-volt battery 118 and a 110-volt AC line 120. When connected to line 120, DC 12-volt power flows from AC/DC transformer 122 (not depicted) through battery 118.

Preferably, battery 18 is rechargeable and replaceable, being removably mounted. On/off power switch 123 controls power to pump 116 as desired by an operator. At least one auxiliary reservoir 124*a* is mounted on structure 117 for holding and supplying at least one auxiliary fluid 126*a* to be controllably mixed with carrier fluid 114 being drawn from principal reservoir 112 by pump 116. In a currently preferred embodiment 110, a second auxiliary reservoir 124*b* is provided for holding a supplying a second auxiliary fluid 126*b*. A three-way valve 128 selects auxiliary fluids 126*a* or 126*b*, or neither, or both in a combination thereof in a first predetermined ratio which may be varied as desired. The flow rate of auxiliary fluid 126*a* preferably is governed by a fixed orifice (not visible) in the flow path. The flow rate of auxiliary fluid 126*b* preferably is governed by a variable orifice 138, e.g., a needle valve controlled manually by an operator. A Venturi tube 130 is disposed in the flow path of output from pump 116 for siphoning the selected and regulated flows of auxiliary fluids 126*a*,126*b* from first and second auxiliary reservoirs 124*a*,124*b*, and then combining such flows with the flow of carrier fluid 114 in a second predetermined ratio. A spray wand 132 in fluid communication with Venturi tube 130 discharges the combination of fluids.

Cover part 117*b* includes first and second cleat brackets 132*a*,132*b* around which sprayer hose 134 may be wrapped for storage, as shown in FIG. 3, which brackets are preferably formed having snap recesses 136*a*,136*b* for receiving spray wands 132 for storage. A hose out port 138 permits attachment of hose 134 to the outlet of Venturi tube 130. Preferably, hinged cover 117*c* is provided with one or more apertures 140 for storage of spray nozzles (not shown) and a saddle opening 142 for storage of an optional spray gun (not shown). Referring to FIG. 2, preferably cover part 117*b* is provided with first and second stops 144*a*,144*b* and pivotable clips 146*a*,146*b* defining lid locks for receiving and retaining bail 115 in an upright position while holding structure 117 in place on rim 113.

In operation of embodiment 110 for, e.g., cleaning a target, such as a mini-split air conditioning unit, an operator fills first reservoir 112 with carrier fluid 114, e.g., water or a cleaning solution, fills first and second auxiliary reservoirs 124*a*,124*b* with first and second auxiliary fluids 126*a*,126*b*, which may be, for example, a cleaning solvent and a mold inhibitor. The operator checks the battery 118 for charge and if necessary, plugs in transformer 122 to electric outlet 120. The operator connects the hose 134 to a spray wand 132 and to hose outlet 138. The operator sets the position of selector switch 128 to deliver one or both of auxiliary fluids 126*a*, 126*b* in the desired combination of flows of carrier and auxiliary fluids. The system is now ready for operation. The operator engages switch 123 which energizes pump 116, drawing carrier fluid 114 from reservoir 112. The pumped carrier fluid passes through Venturi tube 130, siphoning the set flows of auxiliary fluids 126*a*,126*b* into combination with the set flow of carrier fluid 114 in a predetermined ratio. The combination is passed through spray wand 134, exiting system 110. When cleaning is complete, the operator may, for example, turn selector switch 128 to turn off flow of both auxiliary fluids 126*a*,126*b* so the system then delivers only carrier fluid 114, e.g., water, which may be used to flush the cleaning target of debris and cleaning fluids.

Figure 5:
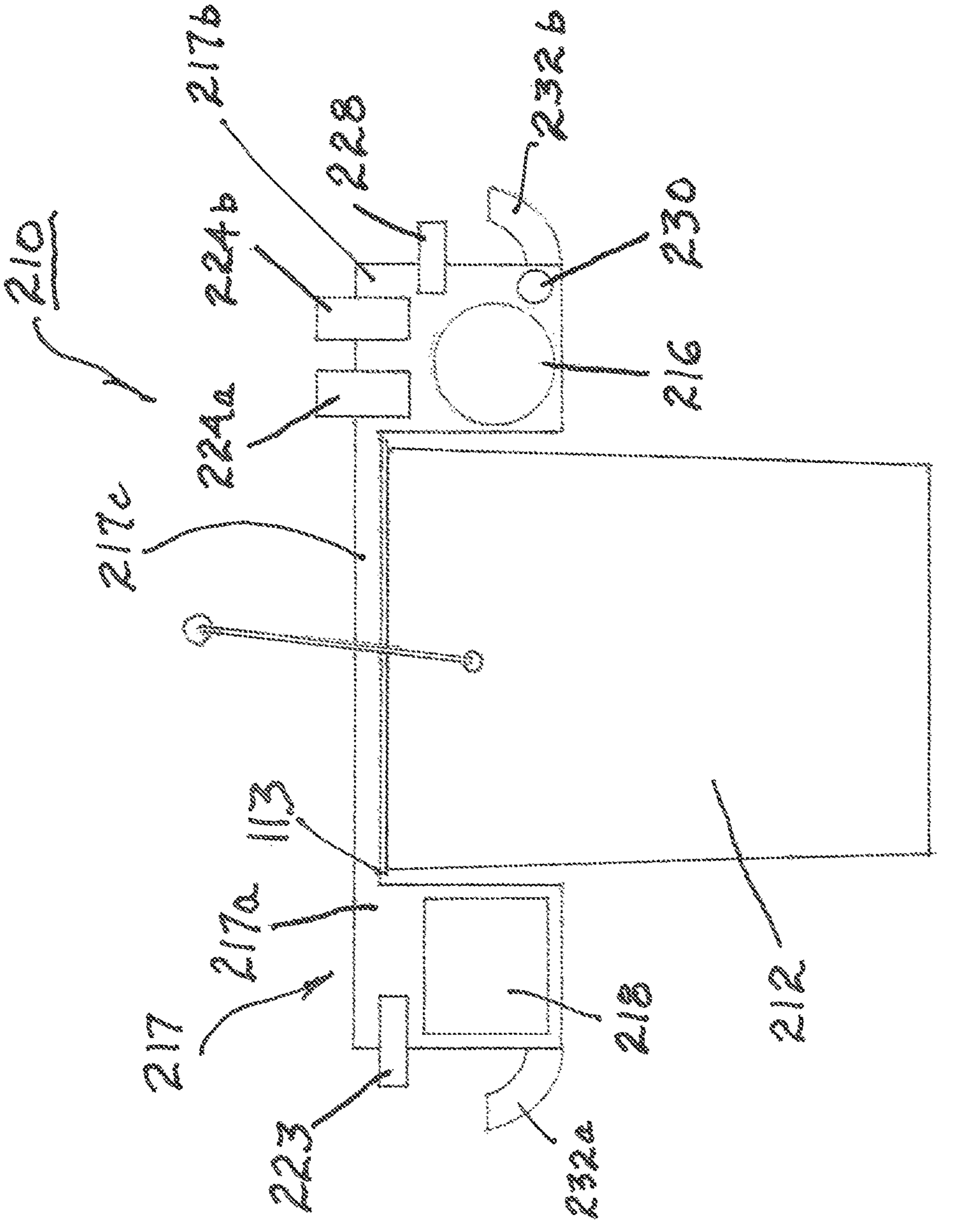
FIG. 5 is a schematic drawing showing a second embodiment in accordance with the present invention.

Referring now to FIG. 5, a second embodiment 210 in accordance with the present invention comprises a second arrangement of elements described hereinabove for first embodiment 110. Structure 217 is in a "saddlebag" shape whereby operative elements are disposed outside of the mouth of container 212 in a left structure 217*a* and a right structure 217*b* connected by a central structure 217*c* that mates with container rim 113. For example, switch 223 and battery 218 may be disposed on left structure 217*a*; and pump 216, auxiliary reservoirs 224*a*, 224*b*, selector valve 228, and Venturi tube 230 may be disposed on right structure 217*b*. The necessary hydraulic and electrical connections (not shown) pass through central structure 217*c*. Cleat brackets 232*a*, 232*b* extend respectively from structures 217*a*,217*b*. Other configurations of embodiment 212 are obviously possible.

Figure 6:
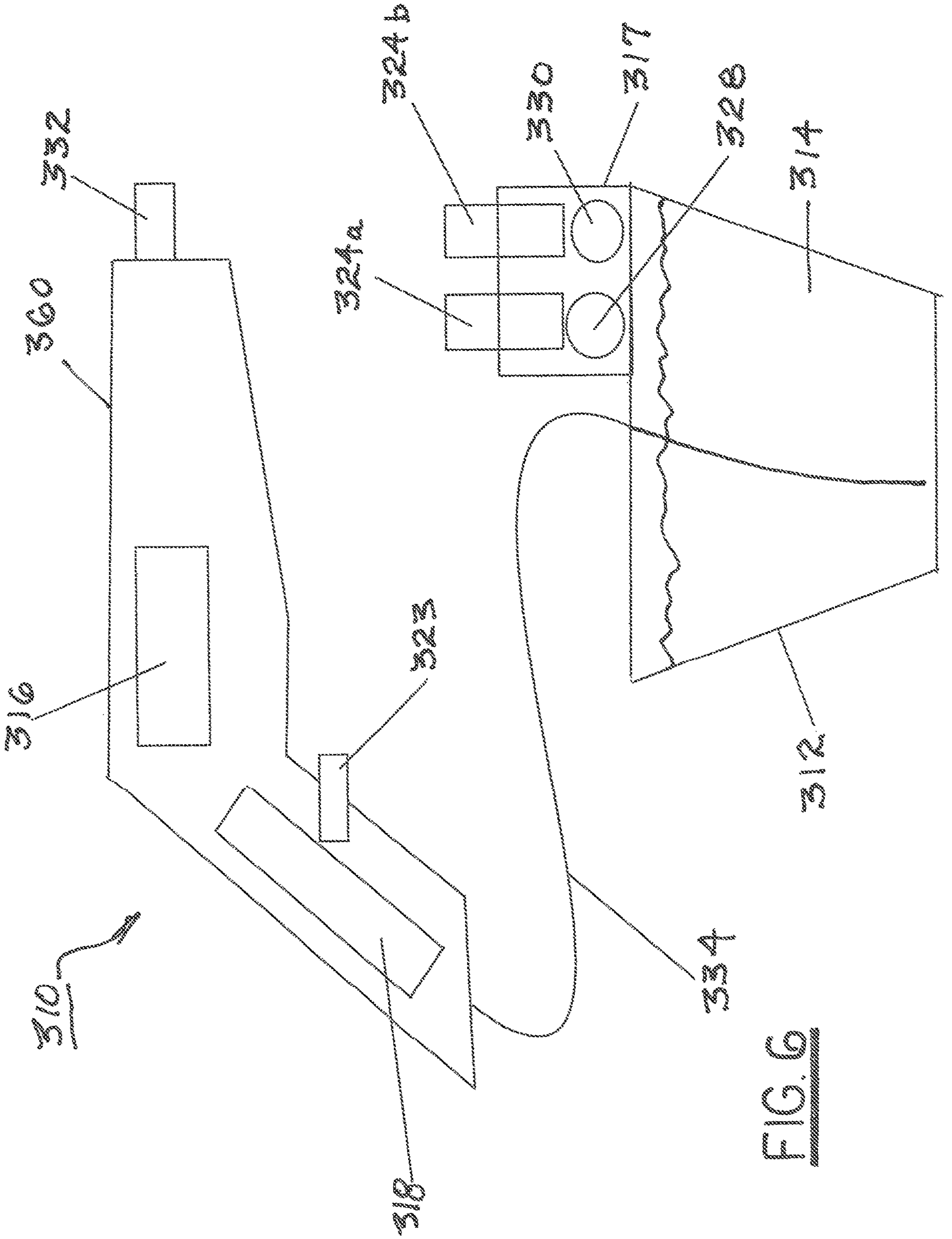
FIG. 6 is a schematic drawing showing a third embodiment in accordance with the present invention.

Referring now to FIG. 6, a third embodiment 310 in accordance with the present invention comprises a third arrangement of elements described hereinabove for first embodiment 110 and additionally a spray gun 360 attached to the outer end of suction hose 334 extending into carrier fluid 314 in container 312. For example, structure 317 mounted on container 312 may be limited to holding first and second auxiliary reservoirs 324*a*,324*b*, selector valve 328, and Venturi tube 330. Battery 318, pump 316, nozzle 332, and switch 323 (which becomes the trigger) are disposed in spray gun 360.

Figure 7:
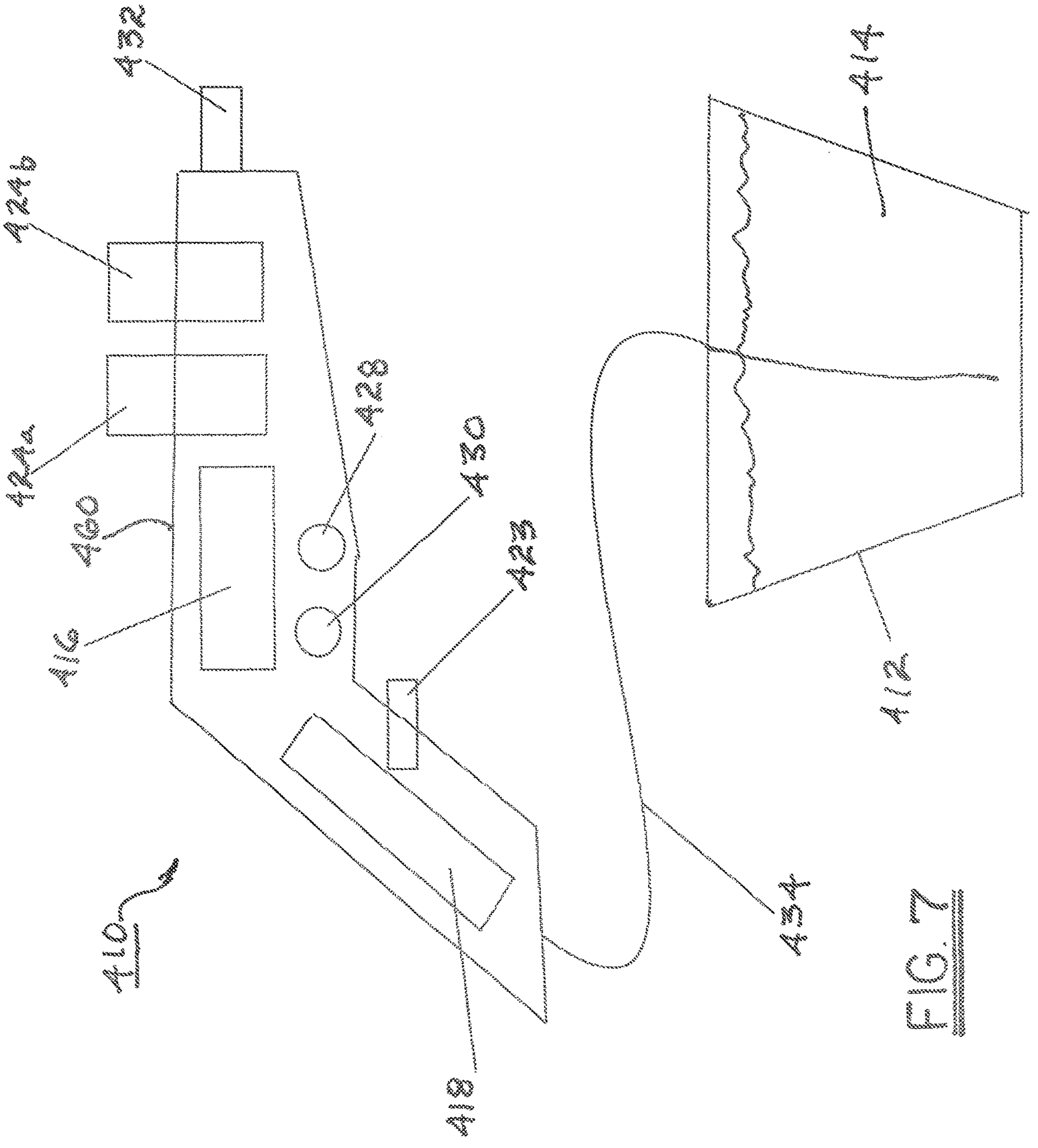
FIG. 7 is schematic drawing showing a fourth embodiment in accordance with the present invention.
Figure 8:
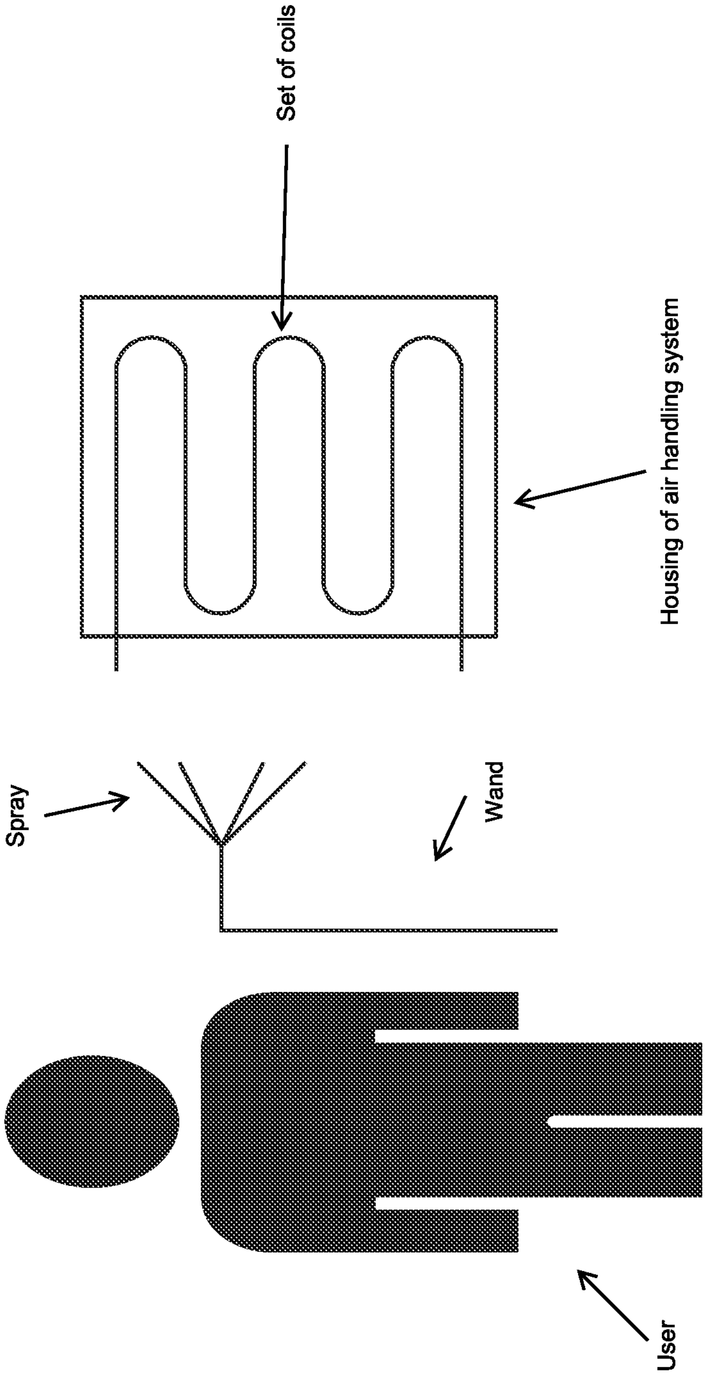
FIG. 8 shows a schematic diagram of the chemical sprayer system in use according to this disclosure.

Referring now to FIG. 7, a fourth embodiment 410 in accordance with the present invention comprises a fourth arrangement of elements described hereinabove for first embodiment 110 wherein all elements are contained in a spray gun 460 attached to the outer end of suction hose 434 extending into carrier fluid 414 in container 412. There is no structure 417. For example, first and second auxiliary reservoirs 424*a*,424*b*, selector valve 428, Venturi tube 430, battery 418, pump 416, nozzle 432, and switch 423 are all disposed in spray gun 460.

While the invention has been described by reference to various specific embodiments, it should be understood that numerous changes may be made within the spirit and scope of the inventive concepts described. Accordingly, it is intended that the invention is not limited to the described embodiments, but will have full scope defined by the language of the following claims.

What is claimed is:

1. A method, comprising:

enabling a user to position a device in proximity of a housing of an air handling system, wherein the device includes a container, an auxiliary reservoir, a pump, a power source, and an output unit, wherein the container is configured to contain a carrier fluid, wherein the auxiliary reservoir is configured to contain an auxiliary fluid, wherein the housing includes a set of coils, wherein the power source is configured to energize the pump as selected between either a battery modality or a corded modality but not both simultaneously, wherein the corded modality is configured to be operative at least based on the battery modality being unable to energize the pump to pump the carrier fluid or the auxiliary fluid, wherein the corded modality involves an electrical cord configured to receive an electrical power from an electric outlet as the electrical cord extends away from the device, wherein the air handling system includes a mini-split air conditioning unit; and enabling the user to operate the device in proximity of the housing of the air handling system via either the battery modality or the corded modality but not both simultaneously such that the carrier fluid sourced from the container and the auxiliary fluid sourced from the auxiliary reservoir are selectively mixed to form an output fluid and the output fluid is directed via the output unit at the set of coils in the housing of the air handling system to clean the set of coils.

2. The method of claim 1, wherein the device includes a lid, wherein the lid hosts the pump, wherein the pump pumps the carrier fluid from the container as the carrier fluid and the auxiliary fluid are selectively mixed to form the output fluid and the output fluid is directed via the output unit at the set of coils in the housing of the air handling system to clean the set of coils.

3. The method of claim 2, wherein the output unit includes a wand directing the output fluid at the set of coils in the housing of the air handling system to clean the set of coils.

4. The method of claim 3, wherein the lid includes a cleat bracket configured to hold the wand.

5. The method of claim 2, wherein the output unit includes a gun directing the output fluid at the set of coils in the housing of the air handling system to clean the set of coils.

6. The method of claim 1, wherein the device includes a lid, an electrical connection, and a battery, wherein the lid includes a first structure, a second structure, and a third structure, wherein the second structure spans between the first structure and the third structure over the carrier fluid contained in the container such that a saddlebag shape is formed, wherein the first structure hosts the pump and the third structure hosts the battery such that the pump is powered by the battery via the electrical connection between the pump and the battery extending along the second structure over the carrier fluid contained in the container as the carrier fluid and the auxiliary fluid are mixed to form the output fluid and the output fluid is directed via the output unit at the set of coils in the housing of the air handling system to clean the set of coils, wherein the battery modality operates the battery.

7. The method of claim 6, wherein the first structure is external to the container.

8. The method of claim 6, wherein the third structure is external to the container.

9. The method of claim 6, wherein the first structure and the third structure are external to the container.

10. The method of claim 6, wherein the output unit includes a wand directing the output fluid at the set of coils in the housing of the air handling system to clean the set of coils.

11. The method claim 10, wherein the lid includes a cleat bracket configured to hold the wand.

12. The method of claim 6, wherein the output unit includes a gun directing the output fluid at the set of coils in the housing of the air handling system to clean the set of coils.

13. The method of claim 1, wherein the container hosts the auxiliary reservoir over the carrier fluid, wherein the output unit includes a battery, wherein the pump is powered by the battery as the carrier fluid and the auxiliary fluid are selectively mixed to form the output fluid and the output fluid is directed via the output unit at the set of coils in the housing of the air handling system to clean the set of coils, wherein the battery modality operates the battery.

14. The method of claim 13, wherein the output unit includes a wand directing the output fluid at the set of coils in the housing of the air handling system to clean the set of coils.

15. The method of claim 13, wherein the output unit includes a gun directing the output fluid at the set of coils in the housing of the air handling system to clean the set of coils.

16. The method of claim 1, wherein the device includes a battery, wherein the output unit includes the auxiliary reservoir, the battery, and the pump, wherein the pump is powered by the battery as the carrier fluid and the auxiliary fluid are selectively mixed to form the output fluid and the output fluid is directed via the output unit at the set of coils in the housing of the air handling system to clean the set of coils, wherein the battery modality operates the battery.

17. The method of claim 16, wherein the output unit includes a wand directing the output fluid at the set of coils in the housing of the air handling system to clean the set of coils.

18. The method of claim 16, wherein the output unit includes a gun directing the output fluid at the set of coils in the housing of the air handling system to clean the set of coils.

19. A method, comprising:

positioning a device in proximity of a housing of an air handling system, wherein the device includes a container, an auxiliary reservoir, a pump, a power source, and an output unit, wherein the container is configured to contain a carrier fluid, wherein the auxiliary reservoir is configured to contain an auxiliary fluid, wherein the housing includes a set of coils, wherein the power source is configured to energize the pump as selected between either a battery modality or a corded modality but not both simultaneously, wherein the corded modality is configured to be operative at least based on the battery modality being unable to energize the pump to pump the carrier fluid or the auxiliary fluid, wherein the corded modality involves an electrical cord configured to receive an electrical power from an electric outlet as the electrical cord extends away from the device, wherein the air handling system includes a mini-split air conditioning unit; and operating the device in proximity of the housing of the air handling system via either the battery modality or the corded modality but not both simultaneously such that the carrier fluid sourced from the container and the auxiliary fluid sourced from the auxiliary reservoir are selectively mixed to form an output fluid and the output fluid is directed via the output unit at the set of coils in the housing of the air handling system to clean the set of coils.

* * * * *